United States Patent
Takagi et al.

(10) Patent No.: US 10,193,414 B2
(45) Date of Patent: Jan. 29, 2019

(54) POWER TRANSMISSION APPARATUS FOR VEHICLE

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Kiyonori Takagi, Okazaki (JP); Hidehiko Banshoya, Toyota (JP); Atsushi Kawamoto, Toyota (JP); Haruhisa Suzuki, Nagoya (JP); Kuniaki Ishii, Toyota (JP); Tooru Matsubara, Toyota (JP); Kazuyuki Shiiba, Miyoshi (JP); Atsushi Tabata, Okazaki (JP); Yuji Yasuda, Miyoshi (JP); Junji Matsushita, Anjo (JP); Katsutoshi Shimizu, Anjo (JP)

(73) Assignees: TOYOTA JIDOSHA KABUSHIKI KAISHA, Toyota (JP); AISIN AW CO., LTD., Anjo (JP)

(*) Notice: Subject to any disclaimer, the term of this patent is extended or adjusted under 35 U.S.C. 154(b) by 237 days.

(21) Appl. No.: 15/360,113

(22) Filed: Nov. 23, 2016

(65) Prior Publication Data

US 2017/0170707 A1 Jun. 15, 2017

(30) Foreign Application Priority Data

Dec. 9, 2015 (JP) .................................. 2015-240646

(51) Int. Cl.
*H02K 9/19* (2006.01)
*H02K 7/00* (2006.01)
(Continued)

(52) U.S. Cl.
CPC ............... *H02K 7/006* (2013.01); *H02K 5/10* (2013.01); *H02K 9/19* (2013.01); *B60K 6/365* (2013.01);
(Continued)

(58) Field of Classification Search
CPC ............ F16H 57/0421; F16H 57/0423; F16H 57/0456; F16H 57/0476; B60K 2001/006;
(Continued)

(56) References Cited

U.S. PATENT DOCUMENTS 2,725,118 A * 11/1955 Clark ...................... D06F 37/36
184/6.18
7,884,511 B2 * 2/2011 Mogi ..................... B60K 17/12
310/54

(Continued)

FOREIGN PATENT DOCUMENTS

JP 2006-298314 A 11/2006
JP 2009-036326 A 2/2009

(Continued)

*Primary Examiner* — Roger L Pang
(74) *Attorney, Agent, or Firm* — Oliff PLC

(57) ABSTRACT

A power transmission apparatus includes a first electric motor, a power split mechanism, a second electric motor, a case, a support wall, and a breather mechanism. The case accommodates the first electric motor, the power split mechanism, and the second electric motor. The support wall is provided between the power split mechanism and the second electric motor. The breather mechanism is located in a rotational angle range that is at least equal to 90 degrees and is smaller than 180 degrees. The breather mechanism has a through hole and a breather chamber. The breather chamber is provided at a case inner side end of the through hole and is opened in a direction that does not oppose a virtual surface that passes through the rotational axis at a rotational angle of 90 degrees of the second electric motor.

3 Claims, 8 Drawing Sheets

(51) Int. Cl.
*H02K 5/10* (2006.01)
*F16H 57/04* (2010.01)
*B60K 8/00* (2006.01)
*B60K 6/405* (2007.10)
*B60K 1/00* (2006.01)
*B60K 11/02* (2006.01)
*B60K 6/365* (2007.10)

(52) U.S. Cl.
CPC ............... *B60K 6/405* (2013.01); *B60K 8/00* (2013.01); *B60K 11/02* (2013.01); *B60K 2001/006* (2013.01); *F16H 57/0421* (2013.01); *F16H 57/0423* (2013.01); *F16H 57/0456* (2013.01); *F16H 57/0476* (2013.01); *H02K 2205/09* (2013.01)

(58) Field of Classification Search
CPC .......... B60K 6/365; B60K 6/405; B60K 8/00; B60K 11/02; H02K 7/006; H02K 9/19; H02K 5/10; H02K 2205/09
See application file for complete search history.

(56) References Cited

U.S. PATENT DOCUMENTS

| | | | |
|---|---|---|---|
| 8,967,306 B2* | 3/2015 | Suzuki | H02K 5/20 180/339 |
| 2005/0034927 A1* | 2/2005 | Hong | F16H 57/027 184/6.23 |
| 2008/0099258 A1* | 5/2008 | Berhan | B60K 6/405 180/65.22 |
| 2014/0290429 A1* | 10/2014 | Hasegawa | F16H 57/027 74/606 A |

FOREIGN PATENT DOCUMENTS

| | | | | |
|---|---|---|---|---|
| JP | 2009-067140 A | 4/2009 | | |
| JP | 2012-082918 A | 4/2012 | | |
| JP | 2012082930 A | * 4/2012 | ............... | B60K 1/00 |
| JP | 2013-036480 A | 2/2013 | | |

* cited by examiner

POWER TRANSMISSION APPARATUS FOR VEHICLE

INCORPORATION BY REFERENCE

The disclosure of Japanese Patent Application No. 2015-240646 filed on Dec. 9, 2015 including the specification, drawings and abstract is incorporated herein by reference in its entirety.

BACKGROUND

1. Technical Field

The present disclosure relates to a power transmission apparatus for a vehicle.

2. Description of Related Art

A power transmission apparatus for a vehicle that includes a cylindrical case, a breather mechanism, and a support wall has been known. The cylindrical case accommodates a first electric motor, a power split mechanism, and a second electric motor coupled to an output shaft that are lubricated by oil. The breather mechanism communicates between inside and outside of the case. The support wall is provided between the power split mechanism and the second electric motor in the case. The support wall constitutes a first accommodating chamber, in which the second electric motor is accommodated, with an inner wall of the case. In such a power transmission apparatus for the vehicle, the power split mechanism, the first electric motor, and the second electric motor are cooled by the oil in the case. The case, which remains liquid-tight, is provided with the breather mechanism. The breather mechanism is configured to prevent entry of foreign substances and water from the outside of the case while communicating between the inside and the outside of the case, so as to suppress an increase in internal pressure of the case, which is caused by expansion of air and the like therein.

In Japanese Patent Application Publication No. 2009-67140 (JP 2009-67140 A), an accommodating chamber for a first electric motor, an accommodating chamber for a power split mechanism, an accommodating chamber for a second electric motor, and the like communicate with each other via a bearing and the like in a case. In JP 2009-67140 A, a breather mechanism is provided in the accommodating chamber for the first electric motor so as to suppress a pressure change in the case. In addition, in order to suppress entry of oil, which is thrown up through rotation of a rotor of the first electric motor, into the breather mechanism, the breather mechanism is provided in an upper portion of the accommodating chamber for the first electric motor in a vertical direction.

SUMMARY

In accordance with an operation point of an engine and a vehicle speed, a rotational direction of the rotor in the first electric motor is changed between a positive direction and a negative direction, which is opposite thereof, during forward traveling of the vehicle. Accordingly, a direction, in which the oil is scattered by the rotation of the rotor, is changed in accordance with whether the rotor rotates in the positive direction or the negative direction. Thus, even in the case where the breather mechanism is provided in the upper portion of the accommodating chamber for the first electric motor in the vertical direction, there is such a possibility that so-called breather blow cannot be suppressed sufficiently when the breather mechanism is provided in the direction, in which the oil is scattered by the rotation of the rotor. In the breather blow, the oil enters inside of the breather mechanism and is leaked to the outside.

The present disclosure provides a power transmission apparatus for a vehicle that suppresses entry of oil into a breather mechanism.

An example aspect of the present disclosure provides a power transmission apparatus for a vehicle. The power transmission apparatus includes a first electric motor, a power split mechanism, a second electric motor, a case in a cylindrical shape, a support wall and a breather mechanism. The second electric motor is coupled to an output shaft. The case accommodates the first electric motor, the power split mechanism, and the second electric motor. The first electric motor, the power split mechanism, and the second electric motor is lubricated by oil. The support wall constitutes an accommodating chamber that accommodates the second electric motor in the case. The support wall is provided between the power split mechanism and the second electric motor. The breather mechanism is located in a rotational angle range that is at least equal to 90 degrees and is smaller than 180 degrees when a rotational angle range of the second electric motor above a rotational axis of the second electric motor in a vertical direction is set from 0 degree to 180 degrees in a rotational direction of the second electric motor during forward traveling of the vehicle. The breather mechanism communicates between inside and outside of the case such that the accommodating chamber and the outside of the case communicate with each other. The breather mechanism has a through hole and a breather chamber, the through hole penetrates the inside and the outside of the case, the breather chamber is provided at a case inner side end of the through hole, and the breather chamber is opened to inside of the accommodating chamber. The breather chamber is opened in a direction that does not oppose a virtual surface. The virtual surface passes through the rotational axis at a rotational angle of 90 degrees of the second electric motor.

In the power transmission apparatus, the breather chamber may be constructed of the case and the support wall. At least one or more ribs may have a directional component in the vertical direction are provided in a portion of the support wall that is located between an opening of the breather chamber and the rotational axis of the second electric motor such that the ribs suppress a flow of the oil toward the opening.

According to the above configuration, the breather mechanism is not located in a range where oil is scattered upward in the vertical direction by rotation of the second electric motor whose rotational direction is determined by a traveling direction of the vehicle, during forward traveling of the vehicle. In addition, in the rotational angle range that is at least equal to 90 degrees and is smaller than 180 degrees, the opening of the breather chamber does not oppose an oil scattering direction of the second electric motor during forward traveling of the vehicle. In this way, during forward traveling, a frequency of which is higher than that of reverse traveling of the vehicle, entry of the oil into the breather mechanism by the rotation of the second electric motor can further be suppressed.

According to the above configuration, the breather mechanism has a breather chamber that is constructed of the case and the support wall. One or more ribs that have a directional component in the vertical direction and that suppress a flow of the oil toward the opening of the breather chamber are formed in a portion of the support wall that is located between the opening of the breather chamber and the rotational axis of the second electric motor. Accordingly, the flow of the oil, which is scattered by the rotation of the second electric motor during forward traveling of the vehicle, toward the opening of the breather chamber is suppressed by the rib(s) having the directional component in the vertical direction. In this way, during forward traveling of the vehicle, the entry of the oil into the breather mechanism by the rotation of the second electric motor can even further be suppressed.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A detailed description will hereinafter be made on an embodiment of a power transmission apparatus for a vehicle of the present disclosure with reference to the drawings.

Figure 1:
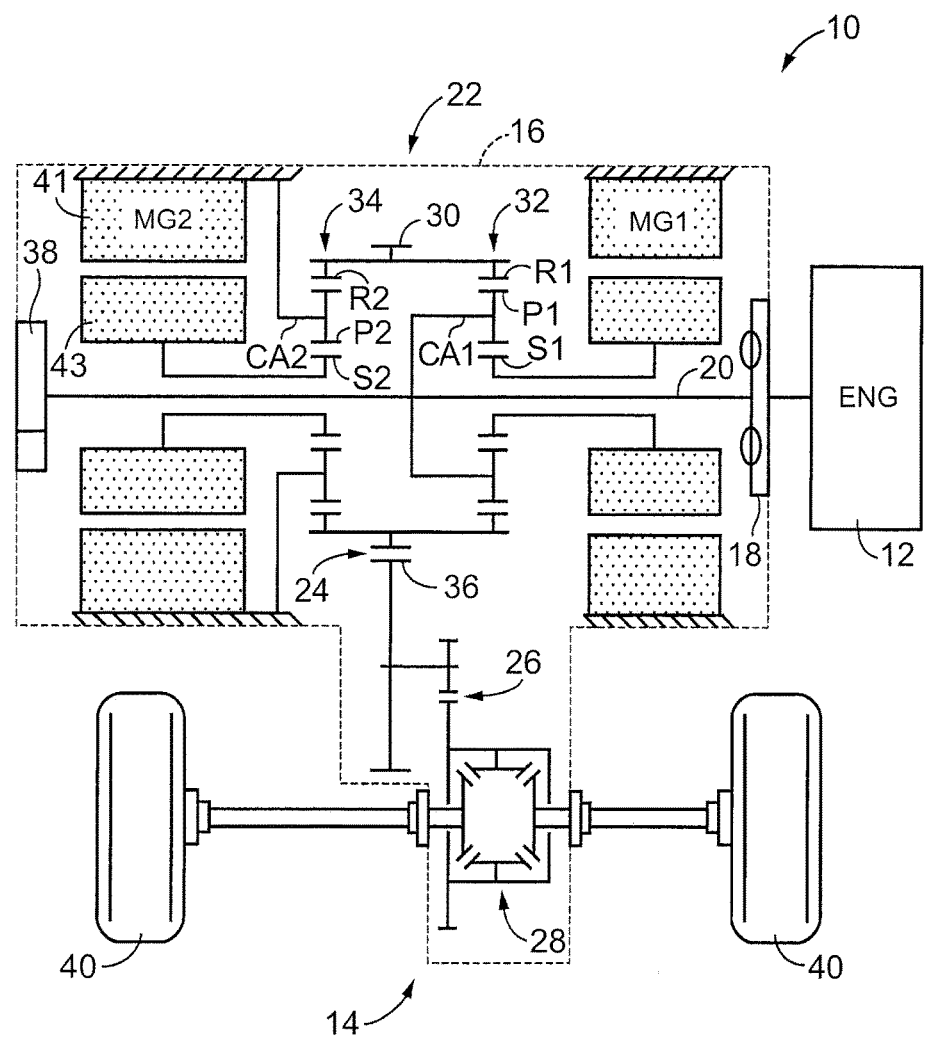
FIG. 1 is a view that describes a schematic configuration of a hybrid vehicle according to an embodiment.

FIG. 1 is a view that describes a schematic configuration of a hybrid vehicle 10 (hereinafter referred to as a vehicle 10) in this embodiment. In FIG. 1, the vehicle 10 includes an engine 12 as one example of a traveling drive power source and a power transmission apparatus 14 as one example of a transaxle (T/A). In a transmission case 16 (hereinafter referred to as a case 16) as a non-rotational member that is attached to a vehicle body, the power transmission apparatus 14 has a damper 18, an input shaft 20, a gear shift section 22, a counter gear pair 24, a final gear pair 26, a differential gear device (a final reduction gear) 28, and the like in an order from the engine 12 side. The gear shift section 22 has a first electric motor MG1, a power split mechanism 32, a gear mechanism 34, and a second electric motor MG2. The power split mechanism 32 is configured to distribute power, which is output from the engine 12, to the first electric motor MG1 and an output gear 30. The gear mechanism 34 is coupled to the output gear 30. The second electric motor MG2 is coupled to the output gear 30 via the gear mechanism 34 in such a manner as to allow power transmission. The output gear 30 is an output rotational member of the gear shift section 22 (the power split mechanism 32). The counter gear pair 24 is configured by including the output gear 30 and a counter driven gear 36. One end of the input shaft 20 is coupled to the engine 12 via the damper 18. In this way, the input shaft 20 is driven by the engine 12 to rotate about a rotational axis C. In addition, an oil pump 38 is coupled to the other end of the input shaft 20. Thus, when the input shaft 20 is rotationally driven, the oil pump 38 is also rotationally driven. In this way, lubricant is supplied to each section of the power transmission apparatus 14, such as the power split mechanism 32, the gear mechanism 34, a ball bearing, which is not shown, the first electric motor MG1, and the second electric motor MG2. In the power transmission apparatus 14, the power of the engine 12, which is input via the damper 18 and the input shaft 20, and power of the second electric motor MG2 are transmitted to the output gear 30, and the power is further transmitted from the output gear 30 to a pair of drive wheels 40 via the counter gear pair 24, the final gear pair 26, the differential gear device 28, a pair of axles, and the like in this order.

The power split mechanism 32 is a planetary gear device of a single pinion type that includes, as rotational elements (rotational members), a first sun gear S1, a first carrier CA1 that supports a first pinion gear P1 in such a manner as to allow rotation and revolution thereof, and a first ring gear R1 that meshes with the first sun gear S1 via the first pinion gear P1. The power split mechanism 32 functions as a differential mechanism that generates a differential action. In this power split mechanism 32, the first carrier CA1 is coupled to the input shaft 20, that is, the engine 12. The first sun gear S1 is coupled to the first electric motor MG1. The first ring gear R1 is coupled to the output gear 30. In this way, the first sun gear S1, the first carrier CA1, and the first ring gear R1 can mutually rotate relative to each other. Thus, in the gear shift section 22, output of the engine 12 is distributed to the first electric motor MG1 and the output gear 30, and the first electric motor MG1 generates electric power by using the power of the engine 12, which is distributed to the first electric motor MG1. The generated electric energy is stored in a power storage device via an inverter, which is not shown, and the second electric motor MG2 is rotationally driven by the electric energy. The gear shift section 22 functions as an electric differential section (an electric continuously variable transmission) whose gear ratio γ0 (=an engine speed Ne/an output rotational speed Nout) is continuously changed by controlling an operation state of the first electric motor MG1. In this way, the gear shift section 22 can actuate the engine 12 at an optimum fuel economy point that is an operation point of an optimum fuel economy of the engine 12, for example. This kind of a hybrid type is referred to as a mechanically-split type or a split type.

The gear mechanism 34 is a planetary gear device of the single pinion type that includes, as rotational elements, a second sun gear S2, a second carrier CA2 that supports a second pinion gear P2 in such a manner as to allow rotation and revolution thereof, and a second ring gear R2 that meshes with the second sun gear S2 via the second pinion gear P2. In the gear mechanism 34, the second carrier CA2 is coupled to the case 16 as a non-rotational member, and rotation thereof is thereby inhibited. The second sun gear S2 is coupled to the second electric motor MG2 via a rotor shaft. The second ring gear R2 is coupled to the output gear 30. Accordingly, the second electric motor MG2 is indirectly coupled to the output gear 30 that functions as an output shaft. For this gear mechanism 34, a gear ratio (a gear ratio=number of teeth of the sun gear S2/number of teeth of the ring gear R2) of the planetary gear device itself is set such that the gear mechanism 34 functions as a reduction gear, for example. During power running, in which torque is output from the second electric motor MG2, rotation of the second electric motor MG2 is decelerated by this gear ratio. In this way, the torque is increased and transmitted to the output gear 30. This output gear 30 is a composite gear whose function as the ring gear R1 of the power split mechanism 32 and the ring gear R2 of the gear mechanism 34 and whose function as the counter driven gear realized by meshing with the counter driven gear 36 and constituting the counter gear pair 24 are integrated in one gear.

Each of the first electric motor MG1 and the second electric motor MG2 is a synchronous electric motor, for example, that has: a function as a motor for generating mechanical power from the electric energy; and a function as a generator for generating the electric energy from the mechanical power. In other words, each of the first electric motor MG1 and the second electric motor MG2 is a motor generator that is selectively actuated as the motor or the generator. For example, the first electric motor MG1 has: a function of generating the electric power by a reaction force of the engine 12; and a function of an electric motor that rotationally drives the engine 12 whose operation is stopped. As the traveling drive power source, the second electric motor MG2 has: a function of the electric motor so as to function as a traveling electric motor that outputs drive power; and an electric power generating function for generating the electric energy due to regeneration of reverse drive power from the drive wheel 40 side. The second electric motor MG2 includes a cylindrical stator 41 that is fixed to the case 16 and a cylindrical rotor 43 that is fixed to the rotor shaft at specified intervals in the stator 41. The stator 41 of the second electric motor MG2 includes: a stator core configured by including plural disc-shaped electromagnetic steel sheets that are stacked in a direction of the rotational axis C; and a stator coil that is projected in the direction of the rotational axis C from both sides of the stator core.

During forward traveling of the vehicle 10, in the power transmission apparatus 14 that is configured as described above, rotation of each of the first electric motor MG1 and the sun gear S1 of the power split mechanism 32, to which the first electric motor MG1 is coupled, is changed between positive rotation and negative rotation in accordance with the operation point of the engine 12 and a vehicle speed in the case where a rotational direction of the output gear 30 during forward traveling of the vehicle 10 is set as the positive rotation. Meanwhile, because the second electric motor MG2 is coupled to the output gear 30 and the ring gear R2, the second electric motor MG2 rotates in the reverse direction of the rotational direction of the output gear 30 as positive rotation during forward traveling of the vehicle 10.

Figure 2:
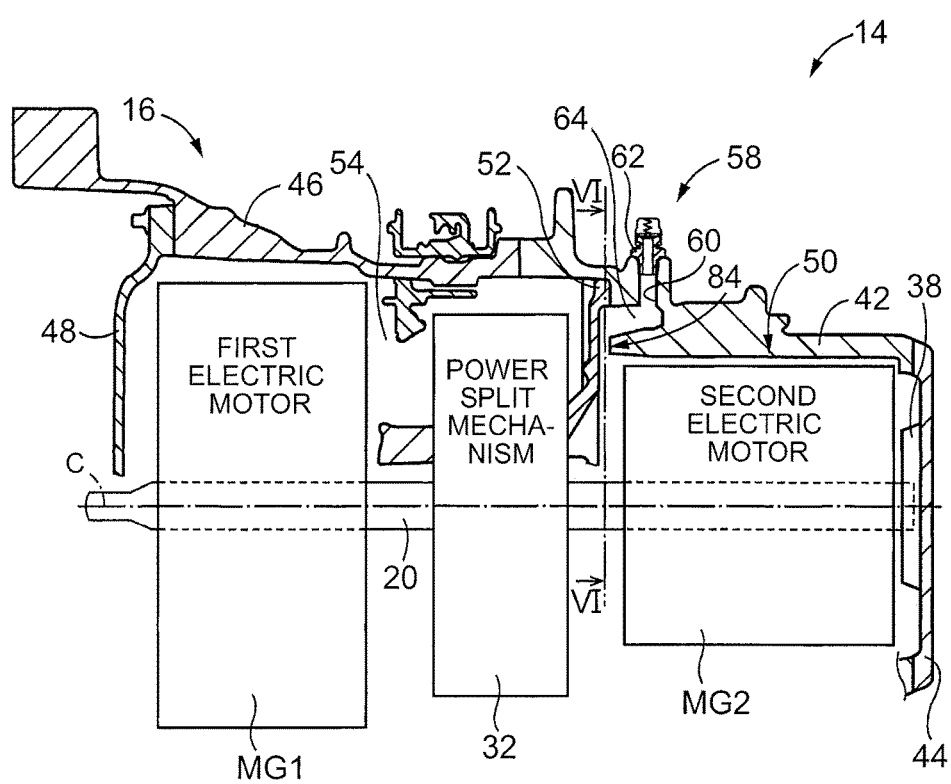
FIG. 2 is a cross-sectional view of a case that accommodates a gear shift section and the like of the hybrid vehicle in FIG. 1, the view including a rotational axis.

FIG. 2 is a cross-sectional view of the case 16 that accommodates the gear shift section 22 and the like and includes the rotational axis C of the input shaft 20. A part of a cross section on an upper side of the rotational axis C of the case 16 in FIG. 2 in a vertical direction (an upper side in FIG. 2) is a cross section that includes a center line of a through hole 60, in which a breather plug 62, which will be described below, is disposed, and a line that is parallel to the rotational axis C. The cylindrical case 16 includes a first cylindrical case 42, an end cover 44 in a flat plate shape, a second cylindrical case 46, and a case cover 48. The first case 42 accommodates the second electric motor MG2 in such a manner as to allow rotation thereof. The end cover 44 closes an opening that is on an opposite side of the engine 12 in the direction of the rotational axis C. Together with the first case 42, the second case 46 accommodates the first electric motor MG1, the power split mechanism 32, the gear mechanism 34, and the like in such a manner as to allow rotation thereof. The case cover 48 closes an opening of the second case 46 that is on an opposite side of the opening on the first case 42 side. In the case 16, a motor cover 52 as one example of a support wall is provided. The motor cover 52 is provided between the gear mechanism 34 and the second electric motor MG2, that is, between the power split mechanism 32 and the second electric motor MG2. Together with the first case 42 and the end cover 44, the motor cover 52 constitutes a first accommodating chamber 50 that accommodates the second electric motor MG2. The motor cover 52 supports the input shaft 20 in such a manner as to allow rotation thereof via a bearing. The first case 42 is fixed to the end cover 44 and the second case 46, the second case 46 is fixed to the case cover 48, and the first case 42 is fixed to the motor cover 52 by fixing members, such as bolts. In this way, the case 16 is configured to be liquid-tight.

The case 16 is configured by including the first case 42, the second case 46 and the case cover 48. The case 16 includes the first accommodating chamber 50 and a second accommodating chamber 54 that is partitioned in such a manner as to communicate with the first accommodating chamber 50. The gear mechanism 34, the power split mechanism 32, and the first electric motor MG1 are accommodated in the second accommodating chamber 54. The input shaft 20 is provided with an axial oil passage in the direction of the rotational axis C and a radial oil passage therein, the radial oil passage communicating with the axial oil passage in a radial direction. When oil is supplied from the oil pump 38, which is driven by the engine 12, through the axial oil passage and the radial oil passage, the power split mechanism 32 and the like in the case 16 are forcibly lubricated. An oil passage, which is not shown, is formed in the end cover 44. An oil pipe 56 (shown in FIG. 6), to which the oil pumped up by the oil pump 38 is supplied via the oil passage, is provided in the direction of the rotational axis C in the upper portion within the first accommodating chamber 50 that includes the rotational axis C of the second electric motor MG2 in the vertical direction. In the portion above the second electric motor MG2, the oil is discharged from this oil pipe 56 toward a coil end of a stator coil of the second electric motor MG2. In this way, the second electric motor MG2 is cooled. In addition, the oil stored in a bottom section of the second accommodating chamber 54 is thrown up to an upper portion within the second accommodating chamber 54 by the gear of the differential gear device 28 side, which constitutes the final gear pair 26. In this way, the power split mechanism 32, the gear mechanism 34, and the like are lubricated. As described above, the first electric motor MG1, the power split mechanism 32, the gear mechanism 34, the second electric motor MG2, and the like are lubricated by the oil in the case 16.

The case 16 is provided with a breather mechanism 58 that communicates between the inside and the outside of the case 16. The breather mechanism 58 guides air that is expanded in conjunction with a temperature change in the liquid-tight case 16 to the outside of the case 16. The breather mechanism 58 thereby suppresses an increase in pressure in the case 16. The breather mechanism 58 is provided such that the inside of the first accommodating chamber 50 communicates with the outside.

The breather mechanism 58 has: the through hole 60 that is provided by penetrating the first case 42 to the upper side in the vertical direction; the breather plug 62 that is attached to a case outer side end of the through hole 60; and a breather chamber 64 that is formed at a case inner side end of the through hole 60 and that is opened to the inside of the first accommodating chamber 50.

The breather plug 62 has a male screw section and a columnar through hole. The male screw section of the breather plug 62 is screwed to a female screw in an oil-tight manner, and the female screw is formed on an inner circumferential surface of the through hole 60 formed in the first case 42. The columnar through hole penetrates the first case 42 such that the inside and the outside thereof communicate with each other. The breather plug 62 includes a breather body in a substantially elongated cylindrical shape, a disc-shaped valve piece, and a coil-shaped spring. The breather body is attached to the female screw, which is formed on the inner circumferential surface of the through hole 60 formed in the first case 42. In such a manner as to close an opening of the through hole of the breather body that is on the outer side of the first case 42, the valve piece of the breather plug 62 is configured to be seated in a peripheral section of the opening. The spring is interposed between the valve piece and a bottom surface of a cap in a pressing state, and the cap is attached to an end of the breather body on the outer side of the first case 42. Accordingly, in the breather plug 62, when it is attempted that the pressure on the inside of the breather chamber 64 is increased to be at least equal to a specified value in conjunction with the temperature change, the compressed air therein is guided to the outside of the first case 42 through the valve piece that is pressed by the spring. As a result, the increase in the pressure on the inside of the case 16, which includes the first accommodating chamber 50 and the second accommodating chamber 54, is suppressed.

Figure 3:
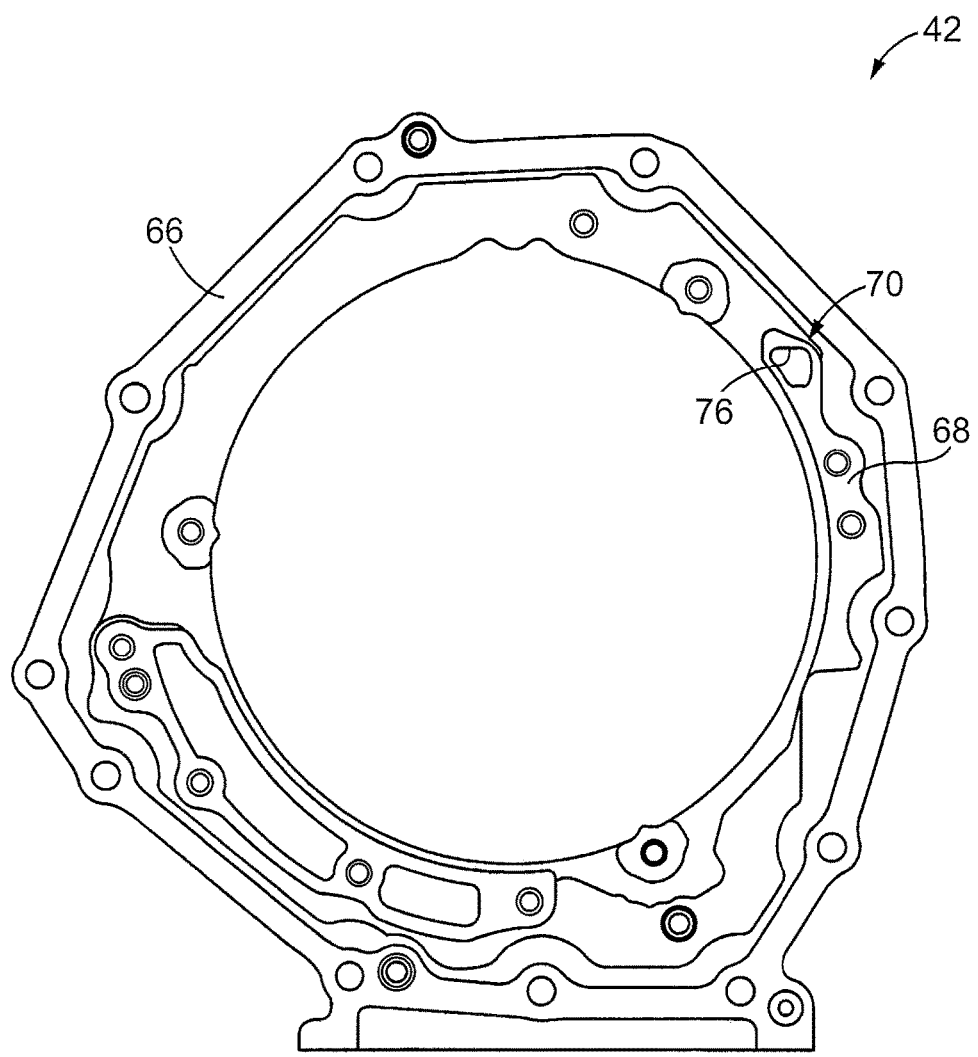
FIG. 3 is a view in which a first case that constitutes the case in FIG. 2 is seen from a power split mechanism side in a direction of the rotational axis.

FIG. 3 is a view in which the first case 42 is seen from the power split mechanism 32 side in the direction of the rotational axis C. Note that an upper direction in FIG. 3 is an upper direction in the vertical direction. The first case 42 includes: an outer circumferential wall section 66 that surrounds the second electric motor MG2; and an attachment wall section 68 that is integrally provided on an inner circumferential side of the outer circumferential wall section 66 and to which the motor cover 52 is attached. An end surface of the outer circumferential wall section 66 in the direction of the rotational axis C functions as an abutment surface that abuts against an end surface of the second case 46. On the power split mechanism 32 side of the attachment wall section 68 and above the rotational axis C in the vertical direction, an elongated hole 70 that is formed from the power split mechanism 32 side to the second electric motor MG2 side is formed. The deepest section of the elongated hole 70 continues to the case inner side end of the through hole 60.

Figure 4:
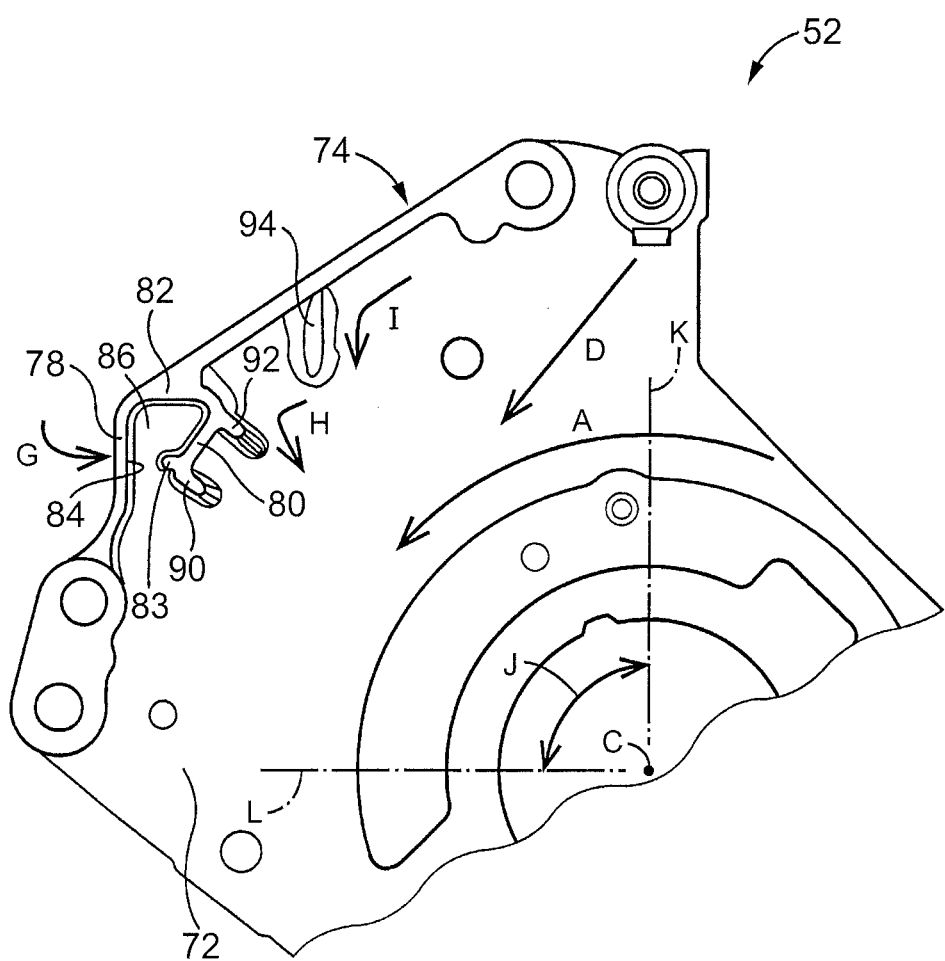
FIG. 4 is a view in which main sections of a motor cover, which is attached to the first case in FIG. 3, are seen from a second electric motor side in the direction of the rotational axis.

FIG. 4 is a view that shows main sections of the motor cover 52 seen from the second electric motor MG2 side in the direction of the rotational axis C. Note that an upper direction in FIG. 4 corresponds to the upper direction in the vertical direction. On the second electric motor MG2 side of the motor cover 52, a partially annular projection 74 is formed within an angular range between a vertical surface K that passes through the rotational axis C and a horizontal surface L that passes through the rotational axis C. The partially annular projection 74 is slightly projected to the second electric motor MG2 side from a wall section 72 that partitions the first accommodating chamber 50 and the second accommodating chamber 54, and functions as an abutment surface that abuts against the attachment wall section 68 of the first case 42. Here, in the case where a rotational angle range of the second electric motor MG2 in the portion above the rotational axis C of the second electric motor MG2 in the vertical direction is set from 0 degree to 180 degrees in a rotational direction of the second electric motor MG2 during forward traveling of the vehicle, the vertical surface K is a virtual surface that passes through the rotational axis C when the rotational angle of the second electric motor MG2 is 90 degrees. The horizontal surface L is a virtual surface that passes through the rotational axis C when the rotational angle of the second electric motor MG2 is 180 degrees. The rotational direction of the above second electric motor MG2 during forward traveling of the vehicle is indicated by an arrow A. The partially annular projection 74 includes a first circumferential wall section 78, a second circumferential wall section 80, a third circumferential wall section 82, and a fourth circumferential wall section 83. The first circumferential wall section 78 is provided in the substantially vertical direction at a position that abuts against a circumferential edge of an opening 76 of the hole 70 provided in the attachment wall section 68 of the first case 42 and that surrounds the opening 76. The second circumferential wall section 80 has vertical components that are formed on the rotational axis C side rather than on the first circumferential wall section 78. The third circumferential wall section 82 connects an upper end of the first circumferential wall section 78 and an upper end of the second circumferential wall section 80 in a substantially horizontal direction. The fourth circumferential wall section 83 is slightly projected from a lower end of the second circumferential wall section 80 toward the first circumferential wall section 78 such that a clearance is formed between the fourth circumferential wall section 83 and the first circumferential wall section 78. In this way, as a clearance between a projected end of the fourth circumferential wall section 83 and the first circumferential wall section 78, an inner opening 84 of the breather chamber 64 is formed on a surface of the motor cover 52 on the second electric motor MG2 side in such a manner as to oppose the horizontal surface L in a lower direction in the vertical direction. Thus, the breather chamber 64 is opened in a direction of not opposing the vertical surface K, which is the virtual surface passing through the rotational axis C when the rotational angle of the second electric motor MG2 is 90 degrees. In addition, on the second electric motor MG2 side of the motor cover 52, a recessed section 86 that is defined by the first circumferential wall section 78, the second circumferential wall section 80, the third circumferential wall section 82, and the fourth circumferential wall section 83 is formed in a rotational angle range J of the second electric motor MG2, and the rotational angle range J is a rotational angle range between the vertical surface K and the horizontal surface L that is at least equal to 90 degrees and is smaller than 180 degrees. Accordingly, the recessed section 86 is located above the rotational axis C of the second electric motor MG2 in the vertical direction. When the motor cover 52 is attached to the first case 42, the breather chamber 64 is configured by including the hole 70, which is formed in the attachment wall section 68 of the first case 42, and the recessed section 86, which is formed in the partially annular projection 74 of the motor cover 52 on the first accommodating chamber 50 side. In this way, the breather chamber 64 is located in the rotational angle range J at a position above the rotational axis C of the second electric motor MG2 in the vertical direction. The breather mechanism 58, which has the breather chamber 64 configured as described above, is located in the rotational angle range J, which is the rotational angle range between the vertical surface K passing through the rotational axis C and the horizontal surface L passing through the rotational axis C and is at least equal to 90 degrees and smaller than 180 degrees, in the case where the rotational angle range of the second electric motor MG2 above the rotational axis C of the second electric motor MG2 in the vertical direction is set from 0 degree to 180 degrees in a rotational direction A of the second electric motor MG2 during forward traveling of the vehicle.

In FIG. 4, the partially annular projection 74 of the motor cover 52 is formed with a first rib 90 and a second rib 92 that respectively extend from the upper end and the lower end of the second circumferential wall section 80 to the inner circumferential side and each has a directional component of the vertical direction. The motor cover 52 is formed with a third rib 94 in the vertical direction.

Figure 5:
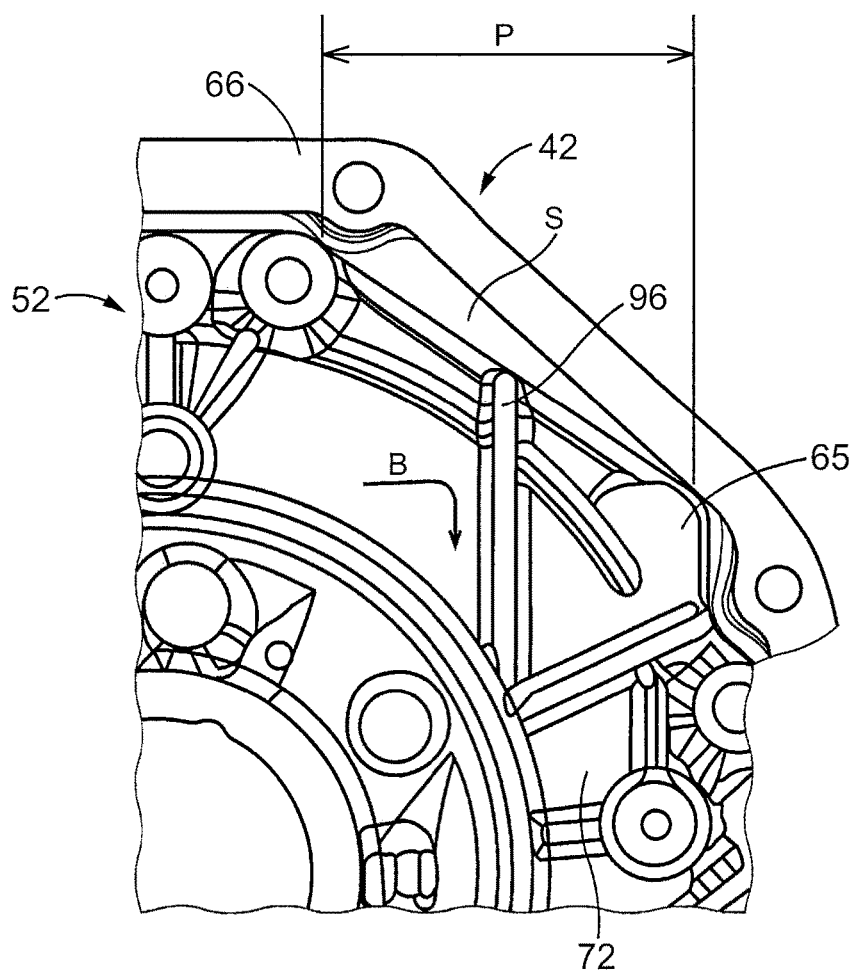
FIG. 5 is a view in which the main sections of the motor cover in FIG. 4 are seen from the power split mechanism side in the direction of the rotational axis.

FIG. 5 is a view showing the main sections of the motor cover 52, which is attached to the first case 42, seen from the power split mechanism 32 side in the direction of the rotational axis C. Note that an upper direction in FIG. 5 corresponds to the upper direction in the vertical direction. The motor cover 52 is fixed to the first case 42 in a state where a radial clearance S, which is partially formed in a circumferential direction, is formed between the motor cover 52 and an inner circumferential surface of the first case 42. On the second accommodating chamber 54 side of the motor cover 52, the clearance S is located above a portion 65, in the vertical direction, which is located on a back side of the breather chamber 64 with the wall section disposed in-between. In other words, the clearance S is located above the breather chamber 64 in the vertical direction. A fourth rib 96 that extends downward in the vertical direction is formed on a lower side near the center of a horizontal dimension P of the clearance S. In addition, the fourth rib 96 is located closer to the power split mechanism 32 than the portion 65 that corresponds to the back side of the breather chamber 64. Accordingly, the fourth rib 96 is located on the first electric motor MG1 side from the breather chamber 64. The power split mechanism 32, the gear mechanism 34, or the like are forcibly lubricated by the oil. The fourth rib 96 inhibits the oil, which is scattered from the power split mechanism 32, the gear mechanism 34, or the like to a portion near the wall section 72 of the motor cover 52, that is, the back portion 65 of the breather chamber 64, from flowing toward the first accommodating chamber 50 through the clearance S. In FIG. 5, a flow of the oil at the time when the oil, which is scattered by the power split mechanism 32 or the gear mechanism 34 and flows toward the clearance S, is inhibited by the fourth rib 96 and is dropped to the lower side in the vertical direction is indicated by an arrow B.

Figure 6:
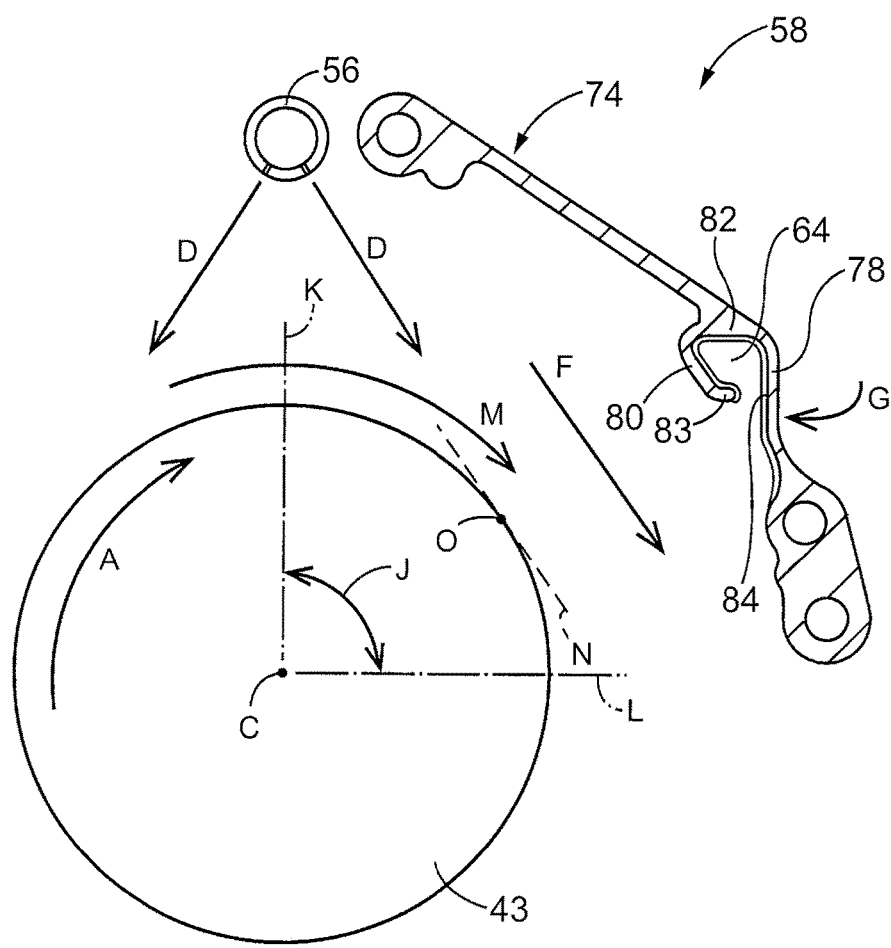
FIG. 6 shows the main sections of the motor cover, which constitutes a first accommodating chamber, in the case in FIG. 2 in a cross-sectional view taken along VI-VI, and is also a view that schematically shows a rotor and an oil pipe of a second electric motor.

FIG. 6 shows the main sections of the motor cover 52 in FIG. 2 in a cross-sectional view taken along VI-VI, and is also a view that schematically shows the rotor 43 and the oil pipe 56 of the second electric motor MG2. During forward traveling of the vehicle, the second electric motor MG2 rotates in an arrow A direction. The second circumferential wall section 80 is formed along a rotational direction F of the second electric motor MG2. The rotational direction F of the second electric motor MG2 is parallel with a tangent N that is indicated by a broken line. The tangent N passes through a portion of the rotor 43 of the second electric motor MG2 that is located between the breather chamber 64 and the rotational axis C of the second electric motor MG2, that is, an intersection point O with a line that connects the breather chamber 64 and the rotational axis C of the second electric motor MG2. The inner opening 84 that is formed as the clearance between the projected end of the fourth circumferential wall section 83, which is provided at the lower end of the second circumferential wall section 80, and the first circumferential wall section 78 neither opposes the vertical surface K nor opposes the rotational direction F of the second electric motor MG2. In addition, as shown in FIG. 4, the first rib 90, the second rib 92, and the third rib 94 in the motor cover 52 are each located at a position on an opposite direction side of the rotational direction F of the second electric motor MG2 from the inner opening 84 of the breather chamber 64 and in the portion located between the inner opening 84 of the breather chamber 64 and the rotational axis C of the second electric motor MG2, so as to suppress the flow of the oil toward the inner opening 84 of the breather chamber 64.

The oil supplied from the oil pipe 56, which is located above the second electric motor MG2 in the vertical direction, to the second electric motor MG2 is discharged in an arrow D direction. This oil supplied from the oil pipe 56 is scattered in an arrow M direction, which is the same direction as the rotational direction A of the second electric motor MG2, by rotation of the rotor 43 of the second electric motor MG2. Because the breather chamber 64 of the breather mechanism 58 is located in the rotational angle range J, the breather chamber 64 is not located in a range where the oil is scattered upward in the vertical direction by the rotation of the second electric motor MG2 during forward traveling of the vehicle. In addition, because the inner opening 84 of the breather chamber 64 does not oppose the vertical surface K, the inner opening 84 in the rotational angle range J does not oppose the oil scattering direction M by the rotation of the second electric motor MG2. Furthermore, the flow of the oil, which is scattered to the portion near the motor cover 52 by the rotation of the second electric motor MG2 during forward traveling of the vehicle, toward the inner opening 84 of the breather chamber 64 is suppressed by the first rib 90, the second rib 92, and the third rib 94. Directions of the oil, which is scattered near the motor cover 52 and is dropped substantially in a vertical downward direction by the first rib 90, the second rib 92, and the third rib 94, are indicated by an arrow H and an arrow I in FIG. 4. In this way, the entry of the oil, which is scattered near the motor cover 52 by the second electric motor MG2, into the breather mechanism 58 through the inner opening 84 of the breather chamber 64 is suppressed. In addition, scattering of the oil, which forcibly lubricates the power split mechanism 32 and the gear mechanism 34 in the second accommodating chamber 54, to the first accommodating chamber 50 side through the clearance S is inhibited by the fourth rib 96 formed on the power split mechanism 32 side of the motor cover 52. The inner opening 84 of the breather chamber 64 is located on a downstream side of the first circumferential wall section 78 in an oil scattering direction G, and the first circumferential wall section 78 is formed in the vertical direction. Thus, even when the oil enters the first accommodating chamber 50 from the second accommodating chamber 54 through the clearance S, the entry of the oil, which is scattered by the power split mechanism 32 or the like, into the inner opening 84 of the breather chamber 64 is suppressed.

As described above, according to the power transmission apparatus 14 of this embodiment, in the case where the rotational angle range of the second electric motor MG2 above the rotational axis C of the second electric motor MG2 in the vertical direction is set from 0 degree to 180 degrees in the rotational direction of the second electric motor MG2 during forward traveling of the vehicle, the breather mechanism 58 is located in the rotational angle range J, which is at least equal to 90 degrees and is smaller than 180 degrees and which is the rotational angle range between the vertical surface K and the horizontal surface L, and is provided to communicate the inside of the first accommodating chamber 50 with the outside of the case 16. In addition, the breather mechanism 58 has: the breather plug 62 attached to the case outer side end of the through hole 60, which penetrates the inside and the outside of the case 16; and the breather chamber 64 that is formed on the case inner side end of the through hole 60 and is opened to the inside of the first accommodating chamber 50. At the rotational angle of 90 degrees of the second electric motor MG2, the breather chamber 64 is opened in a direction that does not oppose the vertical surface K passing through the rotational axis C. Thus, the breather mechanism 58 is not located in a range where the oil is scattered upward in the vertical direction by the rotation of the second electric motor MG2 whose rotational direction is determined by a traveling direction of the vehicle, during forward traveling of the vehicle. In addition, in the rotational angle range J, the inner opening 84 of the breather chamber 64 does not oppose the oil scattering direction M. Thus, during forward traveling, a frequency of which is higher than that of reverse traveling of the vehicle, the entry of the oil into the breather mechanism 58 by the rotation of the second electric motor MG2 can further be suppressed.

In addition, according to the power transmission apparatus 14 of this embodiment, the breather mechanism 58 has the breather chamber 64 that is constructed of the first case 42 and the motor cover 52. In the motor cover 52, the first rib 90, the second rib 92, and the third rib 94, each of which suppresses the flow of the oil toward the inner opening 84 and has the directional component of the vertical direction, is formed in the portion located between the inner opening 84 of the breather chamber 64 and the rotational axis C of the second electric motor MG2. Accordingly, the flow of the oil, which is scattered by the rotation of the second electric motor MG2 during forward traveling of the vehicle, toward the inner opening 84 of the breather chamber 64 is suppressed by the first rib 90, the second rib 92, and the third rib 94, each of which has the directional component of the vertical direction. Therefore, during forward traveling of the vehicle, the entry of the oil into the breather mechanism 58 by the rotation of the second electric motor MG2 can be suppressed.

Furthermore, according to the power transmission apparatus 14 of this embodiment, the motor cover 52 is fixed to the first case 42 in the state where the partial clearance S is formed between the motor cover 52 and the inner circumferential surface of the first case 42. The power split mechanism 32 is lubricated by the oil. The clearance S is located above the breather chamber 64 in the vertical direction. On the power split mechanism 32 side of the motor cover 52, the fourth rib 96, which inhibits the flow of the oil scattered from the power split mechanism 32 toward the first accommodating chamber 50 and has the directional component of the vertical direction, is formed closer to the first electric motor MG1 than to the breather chamber 64. The fourth rib 96 is located on the lower side within the horizontal dimension P of the clearance S. Accordingly, scattering of the oil by the power split mechanism 32 to the inside of the first accommodating chamber 50 through the clearance S between the motor cover 52 and the first case 42 is further suppressed by the fourth rib 96, which is formed closer to the power split mechanism 32 side than to the breather chamber 64 and is formed on the lower side within the horizontal dimension P of the clearance S.

Figure 7:
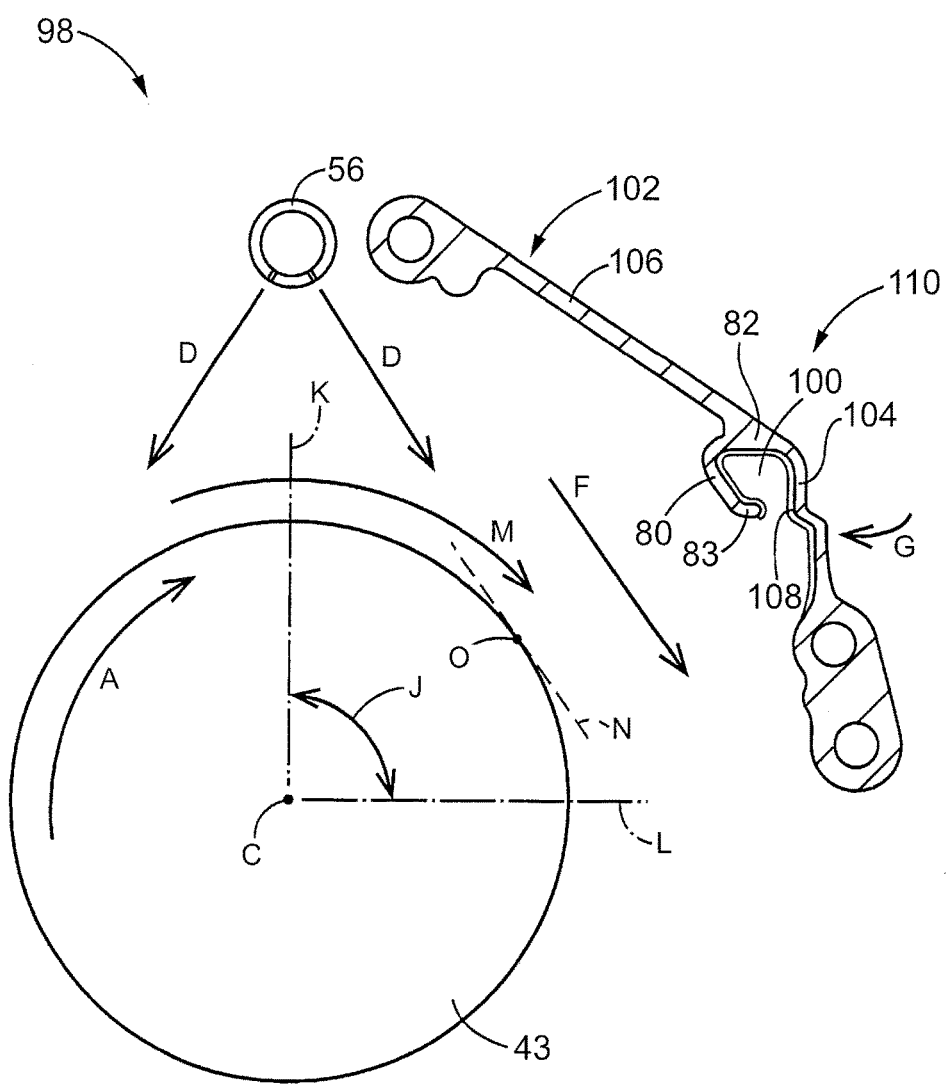
FIG. 7 shows main sections of a motor cover, which is provided in a power transmission apparatus of another embodiment, in a cross-sectional view perpendicular to a rotational axis, and is also a view that schematically shows a rotor and an oil pipe of a second electric motor.

Next, a description will be made on other embodiments with reference to FIG. 7 and FIG. 8. Note that portions in the following embodiments that are substantially in common with those of the above embodiment in terms of functions will be denoted by the same reference numerals and detailed descriptions thereon will not be made.

A power transmission apparatus 98 of this embodiment is substantially in common with the above-described power transmission apparatus 14 in terms of functions except for a point that a shape of a partially annular projection 106 of a motor cover 102 differs around a first circumferential wall section 104, the partially annular projection 106 abutting against the circumferential edge of the opening 76 of the hole 70 on the second electric motor MG2 side of the motor cover 102 constituting a breather chamber 100 with the hole 70 that is formed in the attachment wall section 68 of the first case 42. A description will hereinafter be made on the different point by using FIG. 7. FIG. 7 shows main sections of the motor cover 102 in a cross-sectional view perpendicular to the rotational axis C, and is also a view that schematically shows the rotor 43 and the oil pipe 56 of the second electric motor MG2. The partially annular projection 106 of the motor cover 102 on the second electric motor MG2 side is formed with the first circumferential wall section 104 in the vertical direction that continues to the third circumferential wall section 82, and the third circumferential wall section 82 abuts against the circumferential edge of the opening 76 of the hole 70 in the attachment wall section 68 of the first case 42. The partially annular projection 106 has a shape of being slightly bulged from a lower end of the first circumferential wall section 104 in the vertical direction to an outer circumferential side in such a manner as to follow the rotational direction F of the second electric motor MG2. The breather chamber 100, which is configured by including the hole 70 formed in the attachment wall section 68 of the first case 42 and the partially annular projection 106 of the motor cover 52 on the second electric motor MG2 side, has an inner opening 108 that does not oppose the vertical surface K and the rotational direction F of the second electric motor MG2, and the vertical surface K passes through the rotational axis C at the rotational angle of 90 degrees of the second electric motor MG2. In the case where the rotational angle range of the second electric motor MG2 above the rotational axis C in the vertical direction is set from 0 degree to 180 degrees in the rotational direction A of the second electric motor MG2 during forward traveling of the vehicle, a breather mechanism 110 that has the breather chamber 100 configured as described above is located in the rotational angle range J, which is at least equal to 90 degrees and is smaller than 180 degrees and which is the rotational angle range between the vertical surface K and the horizontal surface L. Because the breather chamber 100 of the breather mechanism 110 is located in the rotational angle range J, the breather chamber 100 is not located in the range where the oil is scattered upward in the vertical direction by the rotation of the second electric motor MG2 during forward traveling of the vehicle. In addition, because the inner opening 108 of the breather chamber 100 does not oppose the vertical surface K, the inner opening 108 in the rotational angle range J does not oppose the oil scattering direction M, in which the oil is scattered by the rotation of the second electric motor MG2 after being supplied from the oil pipe 56 in the D direction. Furthermore, with respect to an oil scattering direction in an arrow G direction, in which the oil is scattered to the first accommodating chamber 50 side through the clearance S by the power split mechanism 32 or the like, the first circumferential wall section 104 is located on an upstream side of the inner opening 108 in the breather chamber 100. The power transmission apparatus 98 that includes the breather mechanism 110 configured as described above exerts similar effects to those of the above-described embodiment.

Figure 8:
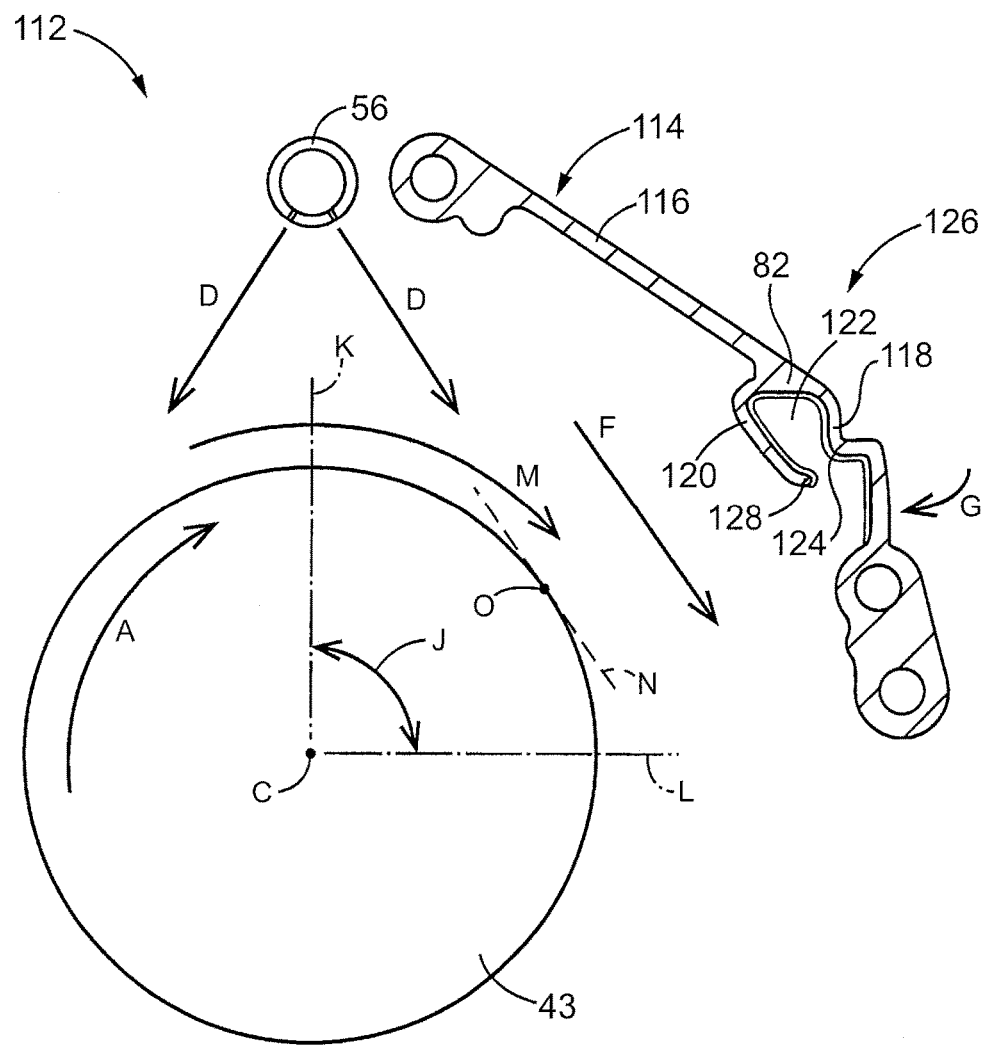
FIG. 8 shows main sections of a motor cover, which is provided in a power transmission apparatus of yet another embodiment, in a cross-sectional view perpendicular to a rotational axis, and is also a view that schematically shows a rotor and an oil pipe of a second electric motor.

FIG. 8 shows main sections of a motor cover 114 of a power transmission apparatus 112 in the cross-sectional view perpendicular to the rotational axis C, and is also a view that schematically shows the rotor 43 and the oil pipe 56 of the second electric motor MG2. A partially annular projection 116 of the motor cover 114 on the second electric motor MG2 side is formed with a first circumferential wall 118 and a second circumferential wall 120, the first circumferential wall 118 continues to the third circumferential wall section 82, which abuts against the circumferential edge of the opening 76 of the hole 70 in the attachment wall section 68 of the first case 42, and extends downward in the vertical direction, and the second circumferential wall 120 extends along the rotational direction F of the second electric motor MG2. The partially annular projection 116 has a shape of slightly being bulged from a lower end of the first circumferential wall 118 in the vertical direction to the outer circumferential side. In addition, the partially annular projection 116 includes a fourth circumferential wall 128 that is formed by slightly bulging an end of the second circumferential wall 120 to an opposite side of the second electric motor MG2 in the substantially horizontal direction, and the end extends lower than the lower end of the first circumferential wall 118 in the vertical direction. A breather chamber 122 is configured by including the hole 70 that is provided in the attachment wall section 68 of the first case 42 and the partially annular projection 116 of the motor cover 52 on the second electric motor MG2 side. The breather chamber 122 has an inner opening 124 that is formed as a clearance between the fourth circumferential wall 128 and the lower end of the first circumferential wall 118. The inner opening 124 faces a wall of the partially annular projection 116 but does not oppose the vertical surface K and the rotational direction F of the second electric motor MG2, the vertical surface K passing through the rotational axis C at the rotational angle of 90 degrees of the second electric motor MG2. In addition, in the case where the rotational angle range of the second electric motor MG2 above the rotational axis C in the vertical direction is set from 0 degree to 180 degrees in the rotational direction A of the second electric motor MG2 during forward traveling of the vehicle, a breather mechanism 126 that has the breather chamber 122 configured as described above is located in the rotational angle range J, which is at least equal to 90 degrees and is smaller than 180 degrees and which is the rotational angle range between the vertical surface K and the horizontal surface L. Because the breather chamber 122 of the breather mechanism 126 is located in the rotational angle range J, the breather chamber 122 is not located in the range where the oil is scattered upward in the vertical direction by the rotation of the second electric motor MG2 during forward traveling of the vehicle. In addition, because the inner opening 124 of the breather chamber 122 does not oppose the vertical surface K, the inner opening 124 in the rotational angle range J does not oppose the oil scattering direction M, in which the oil is scattered by the rotation of the second electric motor MG2 after being supplied from the oil pipe 56 in the D direction. Furthermore, with respect to the oil scattering direction in the arrow G direction, in which the oil is scattered to the first accommodating chamber 50 side through the clearance S by the power split mechanism 32 or the like, the first circumferential wall 118 is located on an upstream side of the inner opening 124 in the breather chamber 122. The power transmission apparatus 112 that includes the breather mechanism 126 configured as described above exerts similar effects to those of the above-described first embodiment. In addition, in the breather mechanism 126 of this embodiment, the inner opening 124 faces the wall of the partially annular projection 116. Thus, compared to the breather mechanism 58 of the above-described first embodiment that includes the breather chamber 64 having the inner opening 84 directed downward in the vertical direction, the entry of the oil, which is scattered by the rotation of the second electric motor MG2 in the vehicle forward traveling direction, into the breather chamber 122 is further suppressed.

Each of the embodiments has been described in detail so far with reference to the drawings. However, this power transmission apparatus can also be implemented in other aspects, and various modifications can be added thereto within the scope that does not depart from the gist thereof.

For example, according to the above-described power transmission apparatus 14, the first rib 90, the second rib 92, and the third rib 94 are formed at the positions on the opposite direction side of the rotational direction F of the second electric motor MG2 from the inner opening 84 of the breather chamber 64 during forward traveling of the vehicle. However, the power transmission apparatus is not limited thereto. For example, one rib may be provided in such a manner as to have a directional component in the vertical direction.

In addition, according to the above-described power transmission apparatus 14, the breather mechanism 58 is provided in the first accommodating chamber 50 of the second electric motor MG2, the rotational direction of which is changed in accordance with the traveling direction of the vehicle. However, the power transmission apparatus is not limited thereto. For example, a power transmission apparatus includes a power split mechanism in which a sun gear is coupled to a first electric motor, a carrier is coupled to an engine, and a ring gear is coupled to a transmission member for transmitting power to a multistage transmission. In the power transmission apparatus, a second electric motor is coupled to the transmission member, and a traveling direction of the vehicle is switched in the multistage transmission. Such a power transmission apparatus may be configured that a breather mechanism for communicating a first accommodating chamber that accommodates the second electric motor to the outside is provided, the breather mechanism is located in a rotational angle range that is at least equal to 90 degrees and is smaller than 180 degrees when the rotational angle range of the second electric motor above a rotational axis of the second electric motor in the vertical direction is set from 0 degree to 180 degrees in the rotational direction of the second electric motor during forward traveling of the vehicle, the breather mechanism has a breather chamber that is opened to the inside of the first accommodating chamber, and the breather chamber is opened in a direction that does not oppose a virtual surface that passes through the rotational axis at a rotational angle of 90 degrees of the second electric motor. According to the power transmission apparatus configured as described above, the rotational direction of the second electric motor is not changed in accordance with the traveling direction of the vehicle. Thus, the entry of the oil, which is scattered by the rotation of the second electric motor, into the breather mechanism is further suppressed during reverse traveling of the vehicle.

Note that what has been described so far is merely one embodiment. Although not exemplified, this power transmission apparatus can be implemented in aspects in which various modifications and improvements are made thereto within the scope that does not depart from the gist thereof on the basis of knowledge of those skilled in the art.

The invention claimed is:

1. A power transmission apparatus for a vehicle, the power transmission apparatus comprising:
    a first electric motor;
    a power split mechanism;
    a second electric motor coupled to an output shaft;
    a case in a cylindrical shape, the case accommodating the first electric motor, the power split mechanism, and the second electric motor, the first electric motor, the power split mechanism, and the second electric motor being lubricated by oil;
    a support wall constituting an accommodating chamber that accommodates the second electric motor in the case, the support wall being provided between the power split mechanism and the second electric motor; and
    a breather mechanism located in a rotational angle range that is at least equal to 90 degrees and is smaller than 180 degrees when a rotational angle range of the second electric motor above a rotational axis of the second electric motor in a vertical direction is set from 0 degree to 180 degrees in a rotational direction of the second electric motor during forward traveling of the vehicle, wherein
    the breather mechanism communicates between inside and outside of the case such that the accommodating chamber and the outside of the case communicate with each other,
    the breather mechanism has a through hole and a breather chamber, the through hole penetrates the inside and the outside of the case, the breather chamber is provided at a case inner side end of the through hole, and the breather chamber is opened to inside of the accommodating chamber, and
    the breather chamber is opened in a direction that does not oppose a virtual surface, the virtual surface passes through the rotational axis at a rotational angle of 90 degrees of the second electric motor.

2. The power transmission apparatus according to claim 1, wherein
    the breather chamber is constructed of the case and the support wall, and
    at least one or more ribs having a directional component in the vertical direction are provided in a portion of the support wall that is located between an opening of the breather chamber and the rotational axis of the second electric motor such that the ribs suppress a flow of the oil toward the opening.

3. The power transmission apparatus according to claim 1, wherein
    the breather mechanism includes a breather plug, and
    the breather plug is configured to guide air in the breather chamber to the outside of the case when pressure in the breather chamber is increased to be at least equal to a specified value.

* * * * *